J. H. MINER.
WHEEL FLANGE LUBRICATOR.
APPLICATION FILED MAR. 4, 1912.
1,050,159.
Patented Jan. 14, 1913.
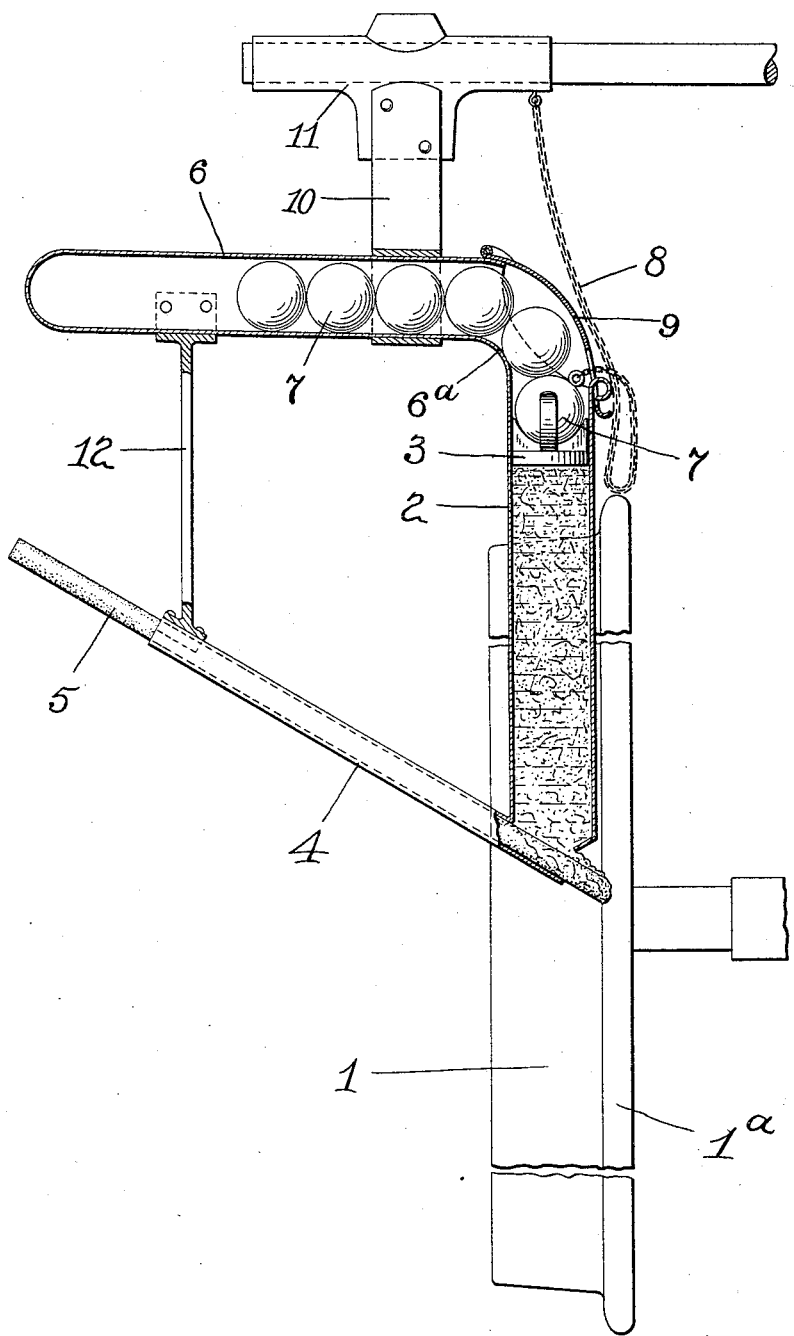
Attest:
Ewd L. Tolson
Chas. F. Calhoun
Inventor:
James H. Miner,
by Spear, Middleton, Donaldson & Spear
Attys.

UNITED STATES PATENT OFFICE.

JAMES H. MINER, OF LUMBERTON, MISSISSIPPI.

WHEEL-FLANGE LUBRICATOR.

1,050,159.  Specification of Letters Patent.  Patented Jan. 14, 1913.

Application filed March 4, 1912. Serial No. 681,632.

*To all whom it may concern:*

Be it known that I, JAMES H. MINER, citizen of the United States, residing at Lumberton, Mississippi, have invented certain new and useful Improvements in Wheel-Flange Lubricators, of which the following is a specification.

My present invention relates to improvements in wheel flange lubricators designed to lubricate the flanges of railway cars, locomotives, street railway cars, and other vehicles running upon rails.

The invention has for its object to provide an extremely simple and economical device which may be readily applied to the vehicle, and in which the lubricant may be easily and quickly replenished when used up, and by which the lubricant will be constantly applied to the wheel flange with an even pressure irrespective of the amount of lubricant and without the use of springs.

With these and other objects in view, the invention includes the novel features of construction and arrangement and combination of parts hereinafter described and particularly defined by the appended claims.

The invention is illustrated in the accompanying drawing in which the figure shows a car wheel in front elevation with the lubricator applied thereto.

Referring by reference characters to this drawing, the numeral 1 designates the car wheel having the usual flange 1ª, and 2 a lubricant container of hollow or tubular form adapted to contain a body of grease above which I place a follower 3. At its lower end the container 2 communicates with an inclined tube 4 within which is slidably held a rod 5. The grease container and tube 4 are supported from the truck frame in the manner hereinafter described, and as there is always some lateral movement of the wheel with relation to the truck, this tends to cause a slight reciprocation of the rod 5 within the tube 4, as the rod 5 tends to be moved by gravity so that its front end is always in contact with the wheel flange, and hence moves back and forth with the lateral movement of the wheel. As the lubricant chamber is in communication with the tube 4, the rod, by its rubbing action, tends to keep its front end coated with and gradually feeds the grease forward to the wheel flange in a limited amount, thus preventing an over supply of grease from reaching the wheel flange. In order to keep the grease forced down by gravity and at a constant pressure, I provide above the grease tube and as a continuation thereof a tubular container 6 in which are provided a plurality of balls 7. This container 6 communicates by a curved portion 6ª with the grease receptacle, and as the grease lowers in the receptacle the balls gradually occupy its place, adding sufficient weight to take the place of the grease which has been removed. After the grease has all been used up, and it is desired to re-fill the receptacle, the balls and follower are raised by flexible elements such as a chain or wire 8, the lowermost ball being connected to the follower so that the follower is raised with the balls. The upper side of the curved part of the tubular container is provided with a hinged cover 9 which may be raised, allowing the lifting of the lowermost ball and follower sufficiently to enable a fresh supply of grease to be placed in the receptacle. The receptacle 2 and the ball carrier 6 are preferably made integral or rigidly connected and supported by a depending arm 10 from an arm 11 carried from a suitable part of the truck frame, and the tube 4 is supported in its front end from the lower end of the grease receptacle and at its rear by a depending arm 12. I prefer to form the rod 5 of hard lubricant such as a stick of hard graphite composition, as by this means I provide the wheel flange with a mixture of soft lubricant, such as grease or oil, and a slight admixture therewith of graphite furnished by the slow wearing away of the end of the rod 5.

I claim as my invention:

1. A wheel flange lubricator comprising a substantially vertically disposed tubular lubricant receptacle having its lower end in proximity to the wheel flange, means for feeding a limited quantity of the lubricant from the lower end of said receptacle to the wheel flange, a substantially horizontally disposed weight container communicating with the upper end of said lubricant receptacle, and a plurality of weights adapted to move from said weight container into said receptacle to constantly maintain an equal amount of pressure upon the lubricant at the lower end of the receiver.

2. A wheel flange lubricator comprising a substantially vertically disposed lubricant receptacle for soft lubricant, an inclined tubular guide having its front end in communication with the lower end of said lubricant receptacle, a feed rod slidably located in said guide, gravity operated weights adapted to replace the lubricant in the receptacle as the level thereof is lowered, and means for raising said weights when the supply of lubricant is to be renewed.

3. A wheel flange lubricator comprising a substantially vertical lubricant receptacle having its lower end in proximity to the wheel flange, means for feeding the lubricant for the lower end thereof to the flange, a substantially horizontal tubular ball container connected to the upper end of said lubricant receptacle by a curved portion, a follower above the lubricant, and a plurality of balls located in said ball container.

In testimony whereof, I affix my signature in presence of two witnesses.

JAMES H. MINER.

Witnesses:
H. W. RUSSELL,
S. E. SLADE.

Copies of this patent may be obtained for five cents each, by addressing the "Commissioner of Patents, Washington, D. C."